US010064059B1

(12) United States Patent
Yu

(10) Patent No.: US 10,064,059 B1
(45) Date of Patent: Aug. 28, 2018

(54) AUTONOMOUS PAIRING OF INTERNET OF THINGS DEVICES UTILIZING BROADCAST PACKETS

(71) Applicant: Chengfu Yu, Irvine, CA (US)

(72) Inventor: Chengfu Yu, Irvine, CA (US)

(\*) Notice: Subject to any disclaimer, the term of this patent is extended or adjusted under 35 U.S.C. 154(b) by 0 days.

(21) Appl. No.: 15/835,985

(22) Filed: Dec. 8, 2017

(51) Int. Cl.
*H04W 12/06* (2009.01)
*H04W 8/24* (2009.01)
*H04W 12/08* (2009.01)
*H04B 1/713* (2011.01)

(52) U.S. Cl.
CPC ............ *H04W 12/06* (2013.01); *H04B 1/713* (2013.01); *H04W 8/24* (2013.01); *H04W 12/08* (2013.01)

(58) Field of Classification Search
CPC ..................................................... H04W 12/06
See application file for complete search history.

(56) References Cited

U.S. PATENT DOCUMENTS

| | | | | |
|---|---|---|---|---|
| 9,027,142 | B1* | 5/2015 | Call | G06F 21/54 726/25 |
| 9,301,141 | B1* | 3/2016 | Mincher | H04W 4/70 |
| 9,510,201 | B1* | 11/2016 | Shimoon | H04W 76/023 |
| 9,699,814 | B2* | 7/2017 | Zakaria | H04W 76/10 |
| 9,832,173 | B2* | 11/2017 | Britt | H04L 12/2809 |
| 9,917,843 | B2* | 3/2018 | Muraoka | H04L 63/104 |
| 9,949,120 | B2* | 4/2018 | Liu | H04W 12/06 |
| 9,955,526 | B1* | 4/2018 | Yu | H04W 76/10 |
| 2011/0321146 | A1* | 12/2011 | Vernon | G06F 21/35 726/7 |
| 2012/0233679 | A1* | 9/2012 | Shedrinsky | H04L 63/0428 726/7 |
| 2013/0282903 | A1* | 10/2013 | DeLuca | H04W 12/04 709/225 |
| 2013/0347083 | A1* | 12/2013 | Baum | H04L 63/083 726/5 |
| 2015/0071052 | A1* | 3/2015 | Hershberg | H04W 24/04 370/216 |
| 2015/0133108 | A1* | 5/2015 | Ahmed | H04W 4/008 455/420 |

(Continued)

*Primary Examiner* — James R Turchen
(74) *Attorney, Agent, or Firm* — Arman Khosraviani

(57) ABSTRACT

An internet of things (IoT) device is disclosed. The IoT device comprising: one or more processors; a machine-readable medium comprising instructions stored therein, which, when executed by the one or more processors cause the one or more processors to perform operations comprising: hopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method; receiving, in response to the hopping, wireless network protocol packets from the one or more wireless network protocol frequency bands on the one or more wireless network protocol broadcast channels; detecting a wireless network protocol broadcast packet of interest from the wireless network protocol broadcast packets; extracting wireless network access credentials from the wireless network protocol broadcast packet of interest; and sending a request to access, to a local wireless access network utilizing the extracted wireless network access credentials.

23 Claims, 7 Drawing Sheets

(56) References Cited

U.S. PATENT DOCUMENTS

| | | | |
|---|---|---|---|
| 2016/0057122 A1* | 2/2016 | van Bergeijk | H04L 63/18 |
| | | | 713/168 |
| 2016/0063228 A1* | 3/2016 | Fang | G06F 3/0362 |
| | | | 726/19 |
| 2016/0127905 A1* | 5/2016 | Liu | H04W 12/06 |
| | | | 370/338 |

* cited by examiner

AUTONOMOUS PAIRING OF INTERNET OF THINGS DEVICES UTILIZING BROADCAST PACKETS

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15488211 filed on Apr. 14, 2017; and entitled AN INTERACTIVE AUGMENTED-REALITY IoT DEVICES SYSTEMS AND METHODS. Nonprovisional patent application Ser. No. 15490826 filed on Apr. 18, 2017; and entitled GARAGE DOOR CONTROLLER AND MONITORING SYSTEM AND METHOD. Nonprovisional patent application Ser. No. 15620749 filed on Jun. 12, 2017; and entitled SMART REGISTER DEVICE AND METHOD. Nonprovisional patent application Ser. No. 15625601 filed on Jun. 16, 2017; and entitled SMART FAN AND VENTILATION DEVICE AND METHOD. Nonprovisional patent application Ser. No. 15649316 filed on Jul. 14, 2017; and entitled AUTONOMOUS PAIRING OF INTERNET OF THINGS DEVICES UTILIZING BROADCAST PACKETS. Nonprovisional patent application Ser. No. 15680146 filed on Aug. 17, 2017; and entitled DETERMINING A COMMUNICATION LANGUAGE FOR INTERNET OF THINGS DEVICES. Nonprovisional patent application Ser. No. 15703718 filed on Jun. 5, 2017; and entitled AUTONOMOUS AND REMOTE PAIRING OF INTERNET OF THINGS DEVICES UTILIZING A CLOUD SERVICE II. Nonprovisional patent application Ser. No. 1818275 filed on Nov. 20, 2017; and entitled AUTOMATED SMART DOORBELL DEVICE AND METHOD.

TECHNICAL FIELD

The present disclosure generally relates to internet of things (IoT) devices and in particular, for example, to pairing of the IoT devices in a WiFi™ network.

BACKGROUND

The WiFi™ standard (e.g., IEEE 802.11) is evolving and has multiple revisions. The market has a number of WiFi™ routers based on different revisions of the WiFi™ standard. For example, some have hidden SSID and hence it is not possible to know the SSID by trying to use the BSSID. As another example, some of the routers of later revisions of the WiFi™ standard employ dual band routers operating in different frequency bands (e.g., 5 GHz and 2.4 GHz bands) where the BSSID is associated with a frequency band of a sender while an IoT device operates in a second band that has a different BSSID resulting in the IoT failure to join a wireless local network for acquiring the wrong BSSID of the sender. While the revisions are addressing issues that arise from older revisions and provide improvements to the technology, they also present new challenges for existing systems built around older revisions. Accordingly, there is a need in the art to address the challenges arising from newer revisions of the WiFi™ standard and provide new systems to address these challenges.

SUMMARY

The disclosed subject matter relates to an internet of things (IoT) device comprising: one or more processors; a machine-readable medium comprising instructions stored therein, which, when executed by the one or more processors cause the one or more processors to perform operations comprising: hoppinghopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method; receiving, in response to the hoppinghopping, wireless network protocol packets from the one or more wireless network protocol frequency bands on the one or more wireless network protocol broadcast channels; detecting a wireless network protocol broadcast packet of interest from the wireless network protocol broadcast packets; extracting wireless network access credentials from the wireless network protocol broadcast packet of interest; and sending a request to access, to a local wireless access network utilizing the extracted wireless network access credentials.

The disclosed subject technology also relates to a method including: hoppinghopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method; receiving, in response to the hoppinghopping, wireless network protocol packets from the one or more wireless network protocol frequency bands on the one or more wireless network protocol broadcast channels; detecting a wireless network protocol broadcast packet of interest from the wireless network protocol broadcast packets; extracting wireless network access credentials from the wireless network protocol broadcast packet of interest; and sending a request to access, to a local wireless access network utilizing the extracted wireless network access credentials.

The disclosed subject technology further relates to a non-transitory machine-readable medium comprising instructions stored therein, which, when executed by one or more processors of a processing system cause the one or more processors to perform operations including: hopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method; receiving, in response to the hopping, wireless network protocol packets from the one or more wireless network protocol frequency bands on the one or more wireless network protocol broadcast channels; detecting a wireless network protocol broadcast packet of interest from the wireless network protocol broadcast packets; extracting wireless network access credentials from the wireless network protocol broadcast packet of interest; and sending a request to access, to a local wireless access network utilizing the extracted wireless network access credentials.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

As noted above, some routers have blind BSSID which limits the ability to extract SSID information of the corresponding router. Dual/multi frequency band routers similarly represents a challenge in finding their SSID, since a wireless user device for example might be operating in one band while a desired IoT device might be operating on a second frequency band. The present disclosure is a proposal to overcome these challenges and ensure a quick and successful addition of an IoT device to the appropriate wireless local network, by providing the SSID and the passphrase of the access point network while meeting the maximum payload size allowable of 1460.

In some aspects of the technology, wireless network access credentials used to access the local area network include a service set identifier (SSID) and a passphrase word. And where the wireless network access credentials are encoded utilizing a private coding method, and wherein the IoT device comprises instructions stored therein to decode the private coding method, where the broadcast packet of interest comprises a private key password and where wherein the private key password and a device identification number are sent to a cloud server. In response, the cloud server utilizes the private key password and the device identification number to allow adding a IoT device to a user account.

In some aspects, the private coding method codes a character with a unique three-digit word and assigns a sequential number to indicate the order of a character as it appears in the wireless access credentials and wherein the sequential number is located next to each of the digits of the three-digit word resulting in a unique numerical code for each character. Further, the length of the wireless network protocol broadcast packet is varied based on the unique numerical code. In one or more implementations, the wireless network protocol broadcast packet further includes a header comprising management information. According to aspects of the technology, detecting a wireless network protocol broadcast packet of interest is based on utilizing a previously received unique packet by the IoT device.

Figure 1:
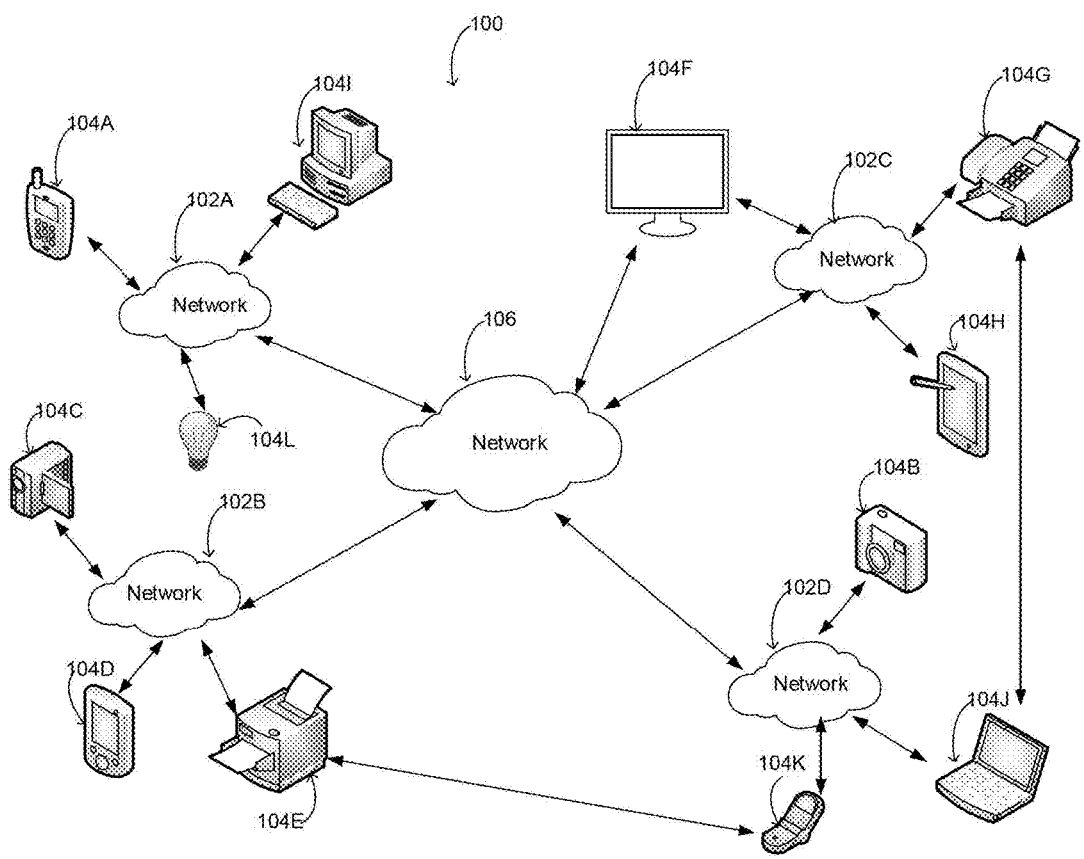
FIG. 1 illustrates an exemplary network environment for implementing an IoT system in accordance with one or more embodiments of the present disclosure.

FIG. 1 illustrates an exemplary network environment 100 for implementing an IoT system in accordance with one or more embodiments of the present disclosure. Not all of the depicted components may be required. However, one or more implementations may require additional components, fewer components or different component not shown in network environment 100. Thus, any variations in network environment 100 may be implemented without departing from the scope of the present disclosure.

Network environment 100 may be a number of networks such as an IoT network, a private network, the internet, any other network, or combinations thereof. The network environment 100 includes networks 102A, 102B, 102C, 102D (hereafter referred to as 102A-102D) and 106. Network environment 100 includes a number of electronic devices 104A, 104B, 104C, 104D, 104E, 104F, 104G, 104H, 104I, 104J, 104K, 104L (hereafter referred to as 104A-104L). One or more of the devices 104A-104L, such as device 104A, may be a device capable of communicating with one or more of devices 104A-104L (e.g., via wired or wireless communication). In some aspects, the devices 104A-104L may include, may be embedded in, or may be coupled to a portable communication device, such as a mobile phone, a laptop, a tablet or any other communication device. The devices 104A-104L may be communicably coupled to one or more of the networks 102A-102D, 106 and/or to one or more other devices of the devices 104A-104L. As depicted in FIG. 1 examples of devices 104A-104L may include a computer, a desktop, a laptop, a tablet, a fax machine, a printer, light bulb and so forth.

One or more of the networks 102A-102D and 106 include one or more wired or wireless devices that facilitate devices communication, such as router devices, switch devices, relay devices, etc., and/or include one or more servers. One or more of the networks 102A-102D and 106, such as network 106 may be, or may include, a cloud of computers. One or more of the networks 102A-102D and 106 may be a local area network that communicatively couples one or more of the devices 104A-104D. In one or more implementations, one or more of networks 102A-102D and 106 may be referred to as an IoT network and/or a machine-to-machine (M2M) network.

One or more of the devices 104A-104L may be referred to as an IoT device and/or an M2M device and may include human-machine interface (HMI) applications and machine-interface applications. There may be multiple paths between one or more of the devices 104A-104L and/or one or more of the networks 102A-102D. One or more of the networks 102A-102D and 106 and/or devices 104A-104D are able to communicate with one another or other systems. One or more of the devices 104A-104L may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104L may include one or more of active devices, passive devices and/or implemented wholly or partially as system on chip devices. Devices 104A-104L may include a transmitter, a receiver, a Global Positioning System (GPS), a Bluetooth (BT)/BLE transceiver and/or a WiFi™ transceiver. In one or more implementations, networks 102A-102D and 106 may include one or more network access points, such as a wireless access point (WAP). Where networks 102A-102D and 106 do not need to have a pre-established network connection with receiving devices to transmit packets and for the devices to receive the transmit packets.

Figure 2:
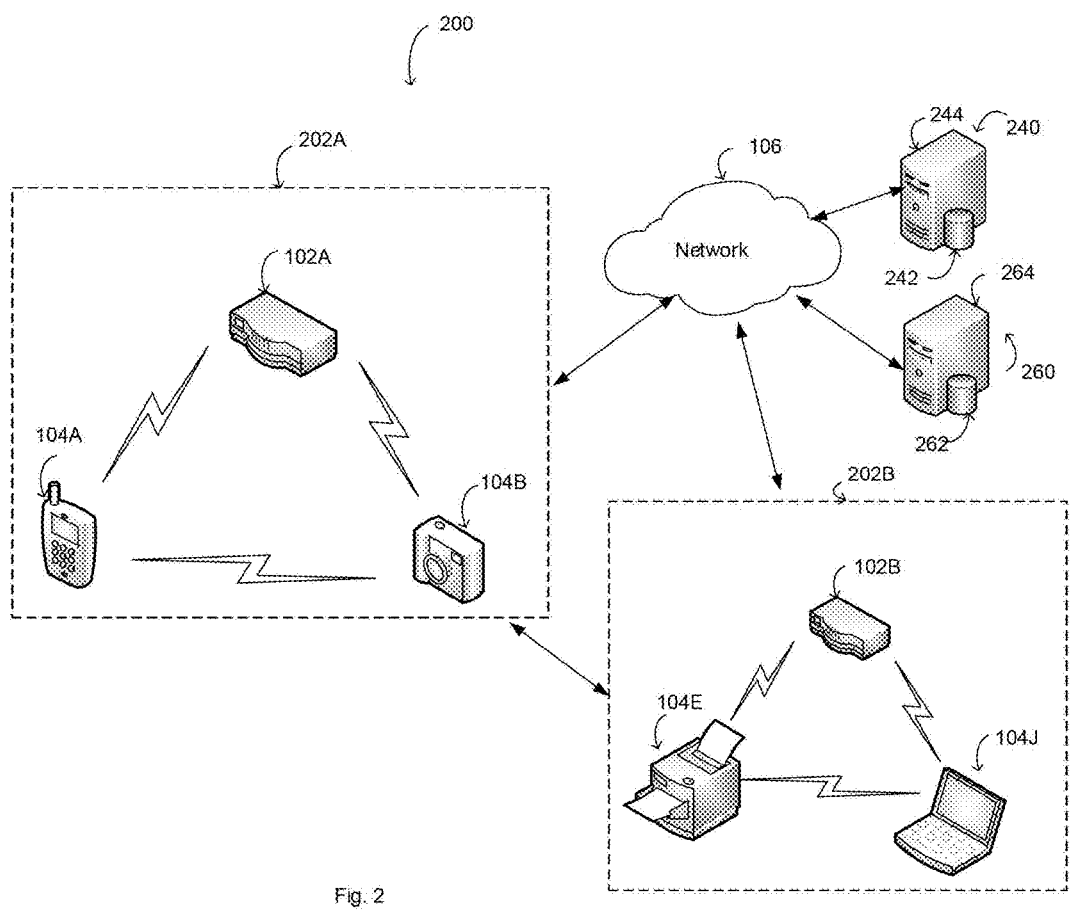
FIG. 2 illustrates exemplary network environments with multiple access points in accordance with one or more embodiments of the present disclosure.

FIG. 2 illustrates exemplary network environments with multiple access points in accordance with one or more embodiments of the present disclosure. Network environment 200 includes wireless local area network 202A, wireless local area network 202B, network 106, and servers 240 and 260. For example, by way of illustration only and not by way of limitation, wireless local area network 202A may include IoT devices 104A and 104B and wireless access point 102B and wireless local area network 202B may include IoT devices 104E and 104J and wireless access point 102B. Servers 240 and 260 may include computing devices 244 and 264 and computer-readable storage devices 242 and 262. The network environment 200 includes a wireless access point 102A that facilitates communication between IoT devices 104A and 104B, and wireless access point 102B that facilitates communication between IoT devices 104E and 104J. Nevertheless, devices within local area network 202A such as IoT device 104B might view both local area network 202A and 202B prior to being associated with a specific local area network such as 202A.

In some aspects, network environment 200 may be a distributed client/server system that spans one or more networks such as, for example, network 106. Network 106 can be a large computer network such as, for example, wide area network (WAN), the Internet, a cellular network, or a combination thereof connecting any number of mobile clients, fixed clients, and servers. Further, the network 106 can include, but is not limited to, any of the following network topologies, including a bus network, a star network, a ring network, a mesh network, a star-bus network, tree or hierarchical network, and the like. In some aspects, communication between IoT devices 104A-104B and servers 240 and 260 can occur via a virtual private network (VPN), Secure Shell (SSH) tunnel, or other secure network connection. In some aspects, network 106 may further include a corporate network (e.g., intranet) and one or more wireless access points.

Wireless local area networks 202A-202B can include, but is not limited to, a computer network that covers a limited geographic area (e.g., a home, school, computer laboratory, or office building) using a wireless distribution method (e.g., spread-spectrum or OFDM). Wireless client devices 104A-104B may associate with wireless access point 102A to access wireless local area network 106 using WiFi™ standards (e.g., IEEE 802.11). Wireless access point 102A may include other network components in addition to a wireless access point. For example, wireless access point 102A may include a router, switch, bridge, broadband modem, etc. According to aspects of the subject technology, wireless access point 102A is a wireless router that provides both access point functionality and network routing functionality.

Server 240 may be any system or device having a processor, a memory, and communications capability for providing content and/or services to the IoT devices 104A-104B, 104E and 104J. In some example aspects, the server 240 can include a single computing device 244, for example, or can include more than one computing device working together to perform the actions of a server (e.g., cloud computing, server farm). Further, the server 240 can represent various forms of servers including, but not limited to, a web server, an application server, a proxy server, etc.

Similarly, server 260 may be any system or device having a processor, a memory, and communications capability for providing content and/or services to the IoT devices 104A-104B, 104E and 104J. In some example aspects, the server 260 can be a single computing device 264, for example, or can include more than one computing device working together to perform the actions of a server (e.g., cloud computing, server farm). Further, the server 260 can represent various forms of servers including, but not limited to, a web server, an application server, a proxy server, etc.

A cloud-based service may include services provided by one or more servers, such as server 240 and server 260, via one or more networks, such as network 106. Cloud-based services may require authentication of user account credentials for access via a cloud-based application, such as a web-based personal portal, a web-based email application, etc. A cloud-based service has access to computer-readable storage devices 242 and 262 and may store information or data of a user once the user account credentials are authenticated. The stored data or information is also available to the user for future access and possible manipulation via other applications that are employed by the user.

Each of IoT devices 104A-104B, 104E and 104J, may represent various forms of processing devices. By way of illustration only and not by way of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 2, IoT devices 104A-104B, WiFi™ enabled devices, connect and communicate with the wireless access point 102A using wireless links. These wireless links may be established and managed using various protocols including the IEEE 802.11 protocols. The IoT devices 104A-104B may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM)

voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

According to aspects of the subject technology, IoT device 104B is a new device and/or an IoT device that requires access to wireless local area network 202A. A user will initiate a HMI within IoT device 104A (e.g., a smart phone device). The HMI accepts an entry from the user, via a user interface, in the form of credentials to access the wireless local area network 202A. The credentials maybe an SSID and a passphrase to enable access to wireless local area network 202A via WAP 102A.

Figure 3:
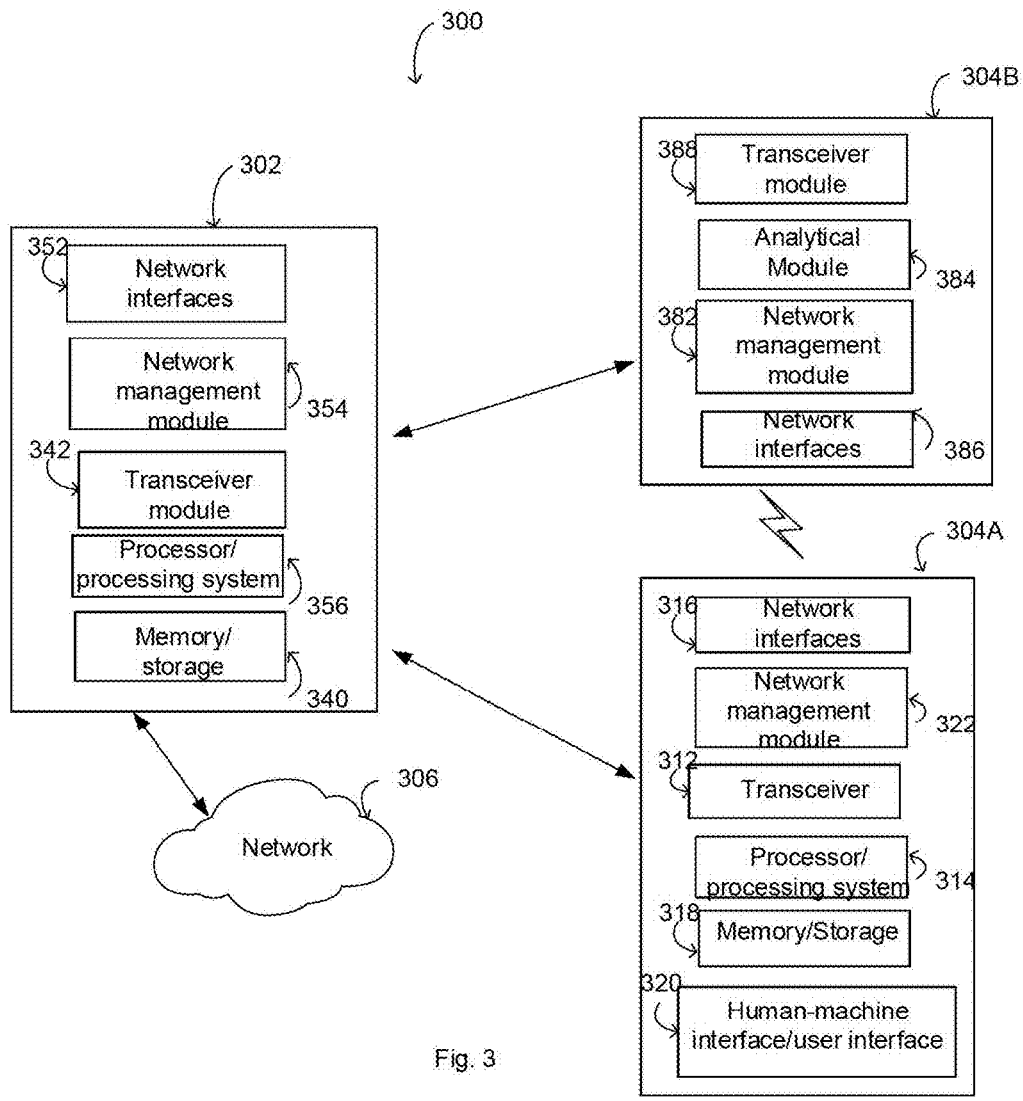
FIG. 3 illustrates an exemplary IoT device, a network wireless access point and network in accordance with one or more embodiments of the present disclosure.

FIG. 3 illustrates an exemplary IoT devices 304A and 304B, network wireless access point 302 and network 306 similar to the IoT devices 104A and 104B, wireless access point 102A-102B and network 106 of FIG. 2, respectively, in accordance with one or more embodiments of the present disclosure. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

IoT device 304A, depicted as a wireless user device, includes processor/processing system 314, memory/storage 318, transceiver 312, HMI application 320, network interfaces 316, network management module 322. Memory/storage 318 may include a dynamic random-access memory (DRAM) and/or a read-only memory (ROM). memory/storage 318 may provide a temporary location to store data and instructions retrieved and processed by processor/processing system 314. memory/storage 318 may include a non-volatile read-and-write memory that stores data and instructions retrieved and processed by processor/processing system 314. For example, memory/storage 318 may include magnetic, solid state and/or optical media.

Processor/processing system 314 may retrieve and execute instructions from memory/storage 318, in order to perform the processes of the subject disclosure. Processor/processing system 314 can be a single processor, a multicore processor, or multiple processors in different implementations. HMI application 320 and network management module 322 may include one or more sets of instructions stored in memory/storage 318 that, when executed by processor/processing system 314, cause processor/processing system 314 to perform operations described herein.

HMI application 320 may be configured to receive and authenticate user credentials for a WAP 302, the HMI 320 may receive an SSID and a passphrase from a user. HMI application 320 requests a UDP/Broadcast packets from network management module to be sent to a WAP such as 302 where the UDP/Broadcast packets are programmed to aid in identifying an access point as an access point of interest. In some aspects, HMI application 320 requests a UDP/Broadcast packets from network management module 322 including the authenticating user credentials to be sent to a WAP such as 302 to aid an IoT device 304B in joining the local area wireless network. Network management module 322 manages IoT device 304A device communications with network interfaces 316 and HMI 320. In some aspects, network interface 316 is a machine-interface.

Wireless access point 302 includes processor/processing system 356, transceiver 342, network interface 352, network management module 354 and memory/storage 340. Wireless access point 302 may establish a network connection with IoT device 304A via network interfaces 352. Memory/storage 340 may include a dynamic random-access memory (DRAM) and/or a read-only memory (ROM). Memory/storage 340 may provide a temporary location to store data and instructions retrieved and processed by processor/processing system 356. Memory/storage 340 may include a non-volatile read-and-write memory that stores data and instructions, even when wireless access point 302 is off, that may be retrieved and processed by processor/processing system 356. For example, memory/storage 340 may include magnetic, solid state or optical media.

Processor/processing system 356 may retrieve and execute instructions from Memory/storage 340 in order to perform the processes of the subject disclosure. Processor/processing system 356 can be a single processor, a multicore processor, or multiple processors in different implementations. Network management module 354 may include one or more sets of instructions stored in Memory/storage 340 that may include instructions that, when executed by processor/processing system 356, cause processor/processing system 356 to perform operations described herein.

Network interface 352 and network management module 354 may be configured to manage the process of associating IoT devices 304A-304B with wireless access point 302. In some aspects, network interface 352 is a machine-interface. For example, network management module 354 may broadcast availability of the wireless access point 302 in a beacon signal and reply to authentication and accessing the wireless local area network requests received from wireless client devices (e.g., IoT devices 104A-104B) according to connection protocols such as the 802.11 protocols and variations described herein. In response to authentication requests from IoT devices 104A-104B, network management module 354 authenticates the network access credentials and, upon authentication, the network management module 354 grants IoT devices 304A and 304B access to WAP 302.

IoT device 304B, depicted as an IoT device to be joined into the WAP 302 network, includes analytical module 384, transceiver module 388, network management module 382 and network interfaces 386. In some aspects, network interface 386 is a machine-interface. Network management module 382 and network interfaces 386 may be configured to manage the discovery of wireless local area networks, identifying an access point within the wireless local area network as an access point of interest. Network management module 382 and network interfaces 386 may be configured to manage the association process between the IoT device 304B and the discovered wireless local area networks. Upon discovery of a wireless access point that supports and accepts the network access credentials as described herein, the network management module 382 may send a request to join WAP 302 network.

Analytical module 384 may include a memory/storage and processor similar to memory/storage 318 and processor/processing system 314 of IoT device 304A. Analytical module 384 utilizes a processor and may retrieve and execute instructions from memory/storage unit within the analytical module 384, in order to perform the processes of the subject disclosure.

Figure 4A:
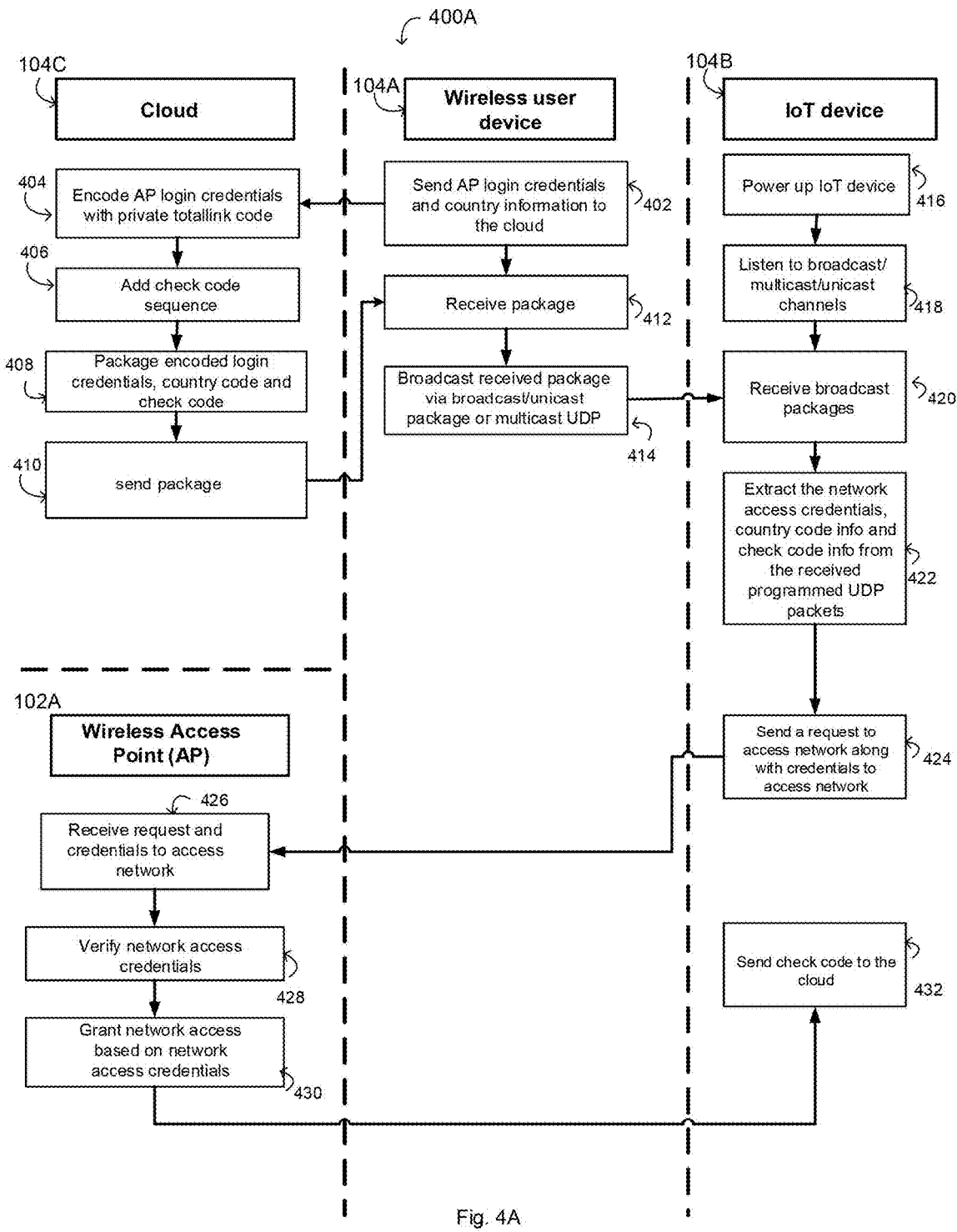
FIG. 4A illustrates an exemplary flow chart of process to enable an IoT device to access a wireless local area access network in accordance with one or more embodiments of the present disclosure.

FIG. 4A illustrates an exemplary flow chart of process to enable an IoT device to access a wireless local area access network in accordance with one or more embodiments of the present disclosure. For explanatory purposes, the example process 400A is described herein with reference to wireless access point 102A, wireless client device 104A, server 240 and IoT device 104B of FIG. 2; however, the example process 400A is not limited to wireless access point 102A, wireless client device 104A, and IoT device 104B of FIG. 2, and the example process 400A may be performed by one or more components of wireless access point 102A, wireless client device 104A, and IoT device 104B. Further for explanatory purposes, the blocks of the example process 400A are described herein as occurring in serial, or linearly. However, multiple blocks of the example process 400A may occur in parallel. In addition, the blocks of the example process 400A may be performed a different order than the order shown and/or one or more of the blocks of the example process 400A may not be performed.

Wireless access point 102A and wireless access point 102B broadcasts a message indicating availability for authentication based on network access credentials. The broadcast message may be a beacon signal announcing the presence of the wireless access point 102A and wireless access point 102B and including information about the wireless local area network associated with the wireless access point 102A and wireless access point 102B such as a network identifier (e.g., SSID). In block 402, wireless user device 104A packages as packets and sends a network access authentication information including SSID and/or passphrase and country information to a cloud server 240. In block 404, upon receiving the packets, the cloud server 240 with a private coding method encodes the network access authentication information utilizing a private coding table.

In one or more implementations, the private coding table is constructed from a number of digits where the digits are between (0-9) namely 10 digits. For example, by way of illustration and not limitation, a three digits private coding table will result in a total of the 120 words utilizing the digits (0-9). In one or more implementations, each word is a private code for an American Standard Code for Information Interchange (ASCII) character. In another example, if more than 120 words is needed then a private coding table utilizing four digits will result in 210 words where the digits are chosen from (0-9). In some aspects, choosing 4 digits from (0-8) will yield a table of 126 words.

According to aspects of the technology, the private coding method assigns a sequential number to indicate the order of a character as it appears in the wireless access credentials and where the sequential number is located next to each of the digits of the three-digit word resulting in a unique numerical code for each character. By way of illustration and not limitations, if a passphrase of a wireless access credentials is 10111111; then according to the private coding table shown below, character "0" is assigned a three-digit word 035 and character "1" is assigned a three-digit word 036. Then the following packets length are created by varying the length of the packets to be indicative of the passphrase 10111111: 10 13 16; 20 23 25; 30 33 36; 40 43 46; 50 53 56; 60 63 66; 70 73 76; 80 83 86. The first digit assigned to next to each digit of the three-digit word of the character indicates the location of the character. That is to say, packets length 20 23 25 are for character "0" and since the first digit of each one of the three-digit word is 2 then this indicates that the character "0" is the second character of the passphrase.

In block 406, the cloud server 240 generates and adds a private key password/check code sequence. In block 408, the encoded network access authentication information, the country information and the private key password/check code sequence are packaged as packets and sent to the wireless user device 104A. In block 410, the packets are transmitted on wireless communication channels between the cloud server 240 and the wireless user device 104A. In block 412, the wireless user device 104A receives the packets and in block 414 the wireless user device 104A transmits the packets utilizing broadcast packets, unicast packets or multicast packets through a local wireless network. The wireless user device might be broadcasting the packets utilizing one of the wireless network 106 broadcast channels in one or more frequency band.

In one or more implementations, a user may have a new IoT device 104B, powered up in block 416, that needs to be part of the wireless local area network, or the IoT device 104B may be an existing IoT device that has lost connection to the wireless local area network. Accordingly, the user may initiate the process of adding the IoT device 104B to the network by utilizing an HMI application on the wireless user device 104A. The user enters the network access credentials (e.g., SSID and passphrase) manually through the HMI application. In one or more implementations, IoT device 104B is within the network coverage of more than one access point such as wireless access point 102A and wireless access point 102B. Accordingly, in block 418, IoT device 104B listens to communication channels of local wireless network. In block 420, IoT device 104B receives the encoded packets broadcast by the wireless user device 104A.

In some aspects, the IoT device 104B utilizes a software, with a predetermined set of instruction stored within the IoT device 104B, to decode the encoded package/packets and extract network access authentication information including SSID and/or passphrase and country information, as shown in block 422. The IoT device 104B has a table to aid in decoding the encoded package. In some aspects, the country information is a country code utilized by the IoT device 104B to choose a primary communication language for the IoT device 104B. The communication language of the IoT device may be used to establish audio voice messages to communicate with a user and aid the user in setting up the IoT device 104B.

According to aspects of the subject technology, the IoT device 104B sends a request to WAP 102A to access the wireless local area network utilizing the extracted network access credentials as depicted in block 424. The WAP 102A receives the request and the network credentials to join the wireless local area network as depicted in block 426. The WAP 102A then verifies and authenticates the network access credentials in block 428 and grants access to IoT device 104B, upon authentication, to the wireless local area network as depicted in block 430. The IoT device 104B transmits the private key password/check code sequence as shown in block 432. In one or more implementations, the private key password/check code sequence is utilized by the cloud server/service to authenticate IoT device 104B to be added by wireless user device 104A and/or to a user account associated to the user of the wireless user device 104A in the cloud server 240 or any other cloud server.

Figure 4B:
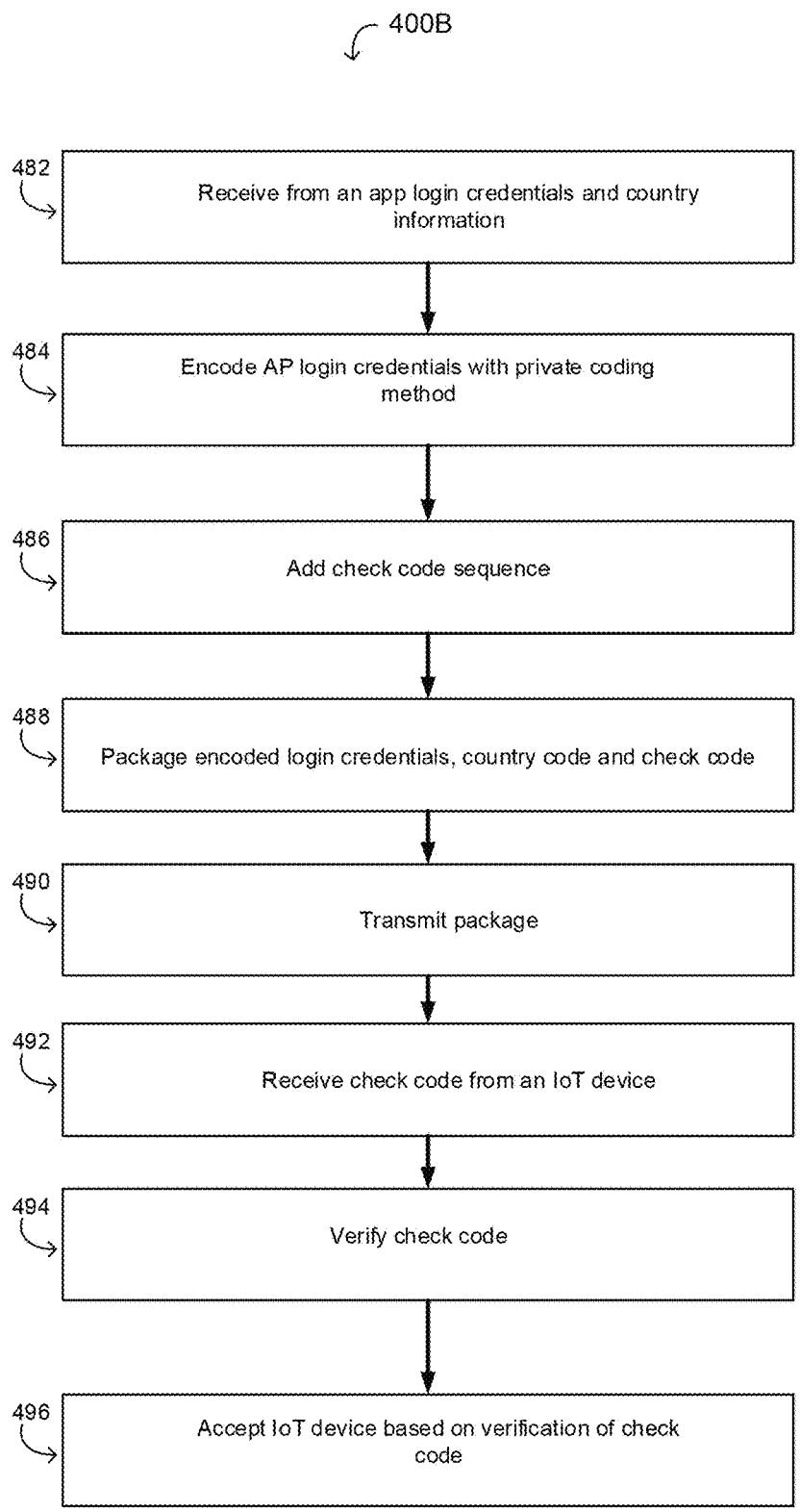
FIG. 4B illustrates an exemplary flow chart for creating a plurality of packets indicative of wireless network access credentials in accordance with one or more embodiments of the present disclosure.

FIG. 4B illustrates an exemplary flow chart to create a plurality of packets indicative of wireless network access credentials in accordance with one or more embodiments of the present disclosure. For explanatory purposes, the example process 400B is described herein with reference to wireless access point 102A, wireless client device 104A, server 240 and IoT device 104B of FIG. 2; however, the example process 400B is not limited to wireless access point 102A, wireless client device 104A, and IoT device 104B of FIG. 2, and the example process 400B may be performed by one or more components of wireless access point 102A, wireless client device 104A, server 240 and IoT device 104B. Further for explanatory purposes, the blocks of the example process 400B are described herein as occurring in serial, or linearly. However, multiple blocks of the example process 400B may occur in parallel. In addition, the blocks of the example process 400B may be performed a different order than the order shown and/or one or more of the blocks of the example process 400B may not be performed.

In one or more implementations, a server (e.g., 240) receives from an application on a wireless user device 104A a package, as shown in block 482. The package may contain network access credentials and a country code information. In block 484, the server encodes the network access credentials using a private coding method. The server may execute programming instructions saved within to perform the encoding of the network access credentials. The private coding method is a special method developed for the purpose of having a more efficient encoding method in using the ASCII coding method/table. The private coding method include a specialized table to perform the encoding. In one or more implementations, the private coding table is constructed from a number of digits where the digits are between (0-9) namely 10 digits. For example, by way of illustration and not limitation, a three digits private coding table will result in a total of the 120 words utilizing the digits (0-9). In one or more implementations, each word is a private code for an American Standard Code for Information Interchange (ASCII) character. In another example, if more than 120 words is needed then a private coding table utilizing four digits will result in 210 words where the digits are chosen from (0-9). In some aspects, choosing 4 digits from (0-8) will yield a table of 126 words.

By way of illustration and not limitations, the table below shows an example of the first 18 words of a 126 words table utilizing a three-digit word for a character and the equivalent ASCII code for each character.

| Number 1 | 0 | 1 | 2 | ' ' | Ascii 32 |
|---|---|---|---|---|---|
| Number 2 | 0 | 1 | 3 | '!' | Ascii 33 |
| Number 3 | 0 | 1 | 4 | '"' | Ascii 34 |
| Number 4 | 0 | 1 | 5 | '#' | Ascii 35 |
| Number 5 | 0 | 1 | 6 | '$' | Ascii 36 |
| Number 6 | 0 | 1 | 7 | '%' | Ascii 37 |
| Number 7 | 0 | 1 | 8 | '&' | Ascii 38 |
| Number 8 | 0 | 1 | 9 | ''' | Ascii 39 |
| Number 9 | 0 | 2 | 3 | '(' | Ascii 40 |
| Number 10 | 0 | 2 | 4 | ')' | Ascii 41 |
| Number 11 | 0 | 2 | 5 | '*' | Ascii 42 |
| Number 12 | 0 | 2 | 6 | '+' | Ascii 43 |
| Number 13 | 0 | 2 | 7 | ',' | Ascii 44 |
| Number 14 | 0 | 2 | 8 | '-' | Ascii 45 |
| Number 15 | 0 | 2 | 9 | '.' | Ascii 46 |
| Number 16 | 0 | 3 | 4 | '/' | Ascii 47 |
| Number 17 | 0 | 3 | 5 | '0' | Ascii 48 |
| Number 18 | 0 | 3 | 6 | '1' | Ascii 49 |

According to aspects of the technology, the private coding method assigns a sequential number to indicate the order of a character as it appears in the wireless access credentials and where the sequential number is located next to each of the digits of the three-digit word resulting in a unique numerical code for each character. By way of illustration and not limitations, if a passphrase of a wireless access credentials is 10111111; then according to the private coding table above, character "0" is assigned a three-digit word 035 and character "1" is assigned a three-digit word 036. Then the following packets length are created by varying the length of the packets to be indicative of the passphrase 10111111: 10 13 16; 20 23 25; 30 33 36; 40 43 46; 50 53 56; 60 63 66; 70 73 76; 80 83 86. The first digit assigned to next to each digit of the three-digit word of the character indicates the location of the character. That is to say, packets length 20 23 25 are for character "0" and since the first digit of each one of the three-digit word is 2 then this indicates that the character "0" is the second character of the passphrase.

In block 486, the private key password/check code sequence is added by the server to the encoded network access credentials and the country information. In one or more implementations, the country information is utilized as is or may be encoded using the private encoding method. The encoded network access credentials, the country code information and the check code sequence are packaged by the server 240 in preparation to be sent to the wireless user device 104A as shown in block 488. The server 240 then transmits the packets as shown in block 490.

The maximum transmission unit (MTU) is the maximum length of data (payload) that can be transmitted by a protocol in one instance. For example, the WiFi™ standard has a 1500 bytes MTU, of which 1460 bytes are the maximum payload size allowable to be transmitted per packet. The number of packets generated still meets this maximum payload size allowable of 1460. In one or more implementations, the package may further include bytes dedicated to at least the length of the SSID and the password, the check code sequence length, the password encoded words, the SSID encoded words, the type of the cyclic redundancy check (e.g., CRC8) and management information/bytes within a header of the packet.

In some aspects of the technology, the server receives the private key password/check code sequence from the IoT device 104B as shown in block 492 and verifies the private key as shown in block 494. The private key password/check code sequence is utilized by the cloud server 240 to authenticate IoT device 104B to be added by wireless user device 104A and/or to a user account associated to the user of the wireless user device 104A in the cloud server 240 or any other cloud server. Upon verification of the private key password by the server 240. The IoT device 104B is cleared and associated to the user account on the cloud and the wireless user device 104A as shown in block 496.

Figure 4C:
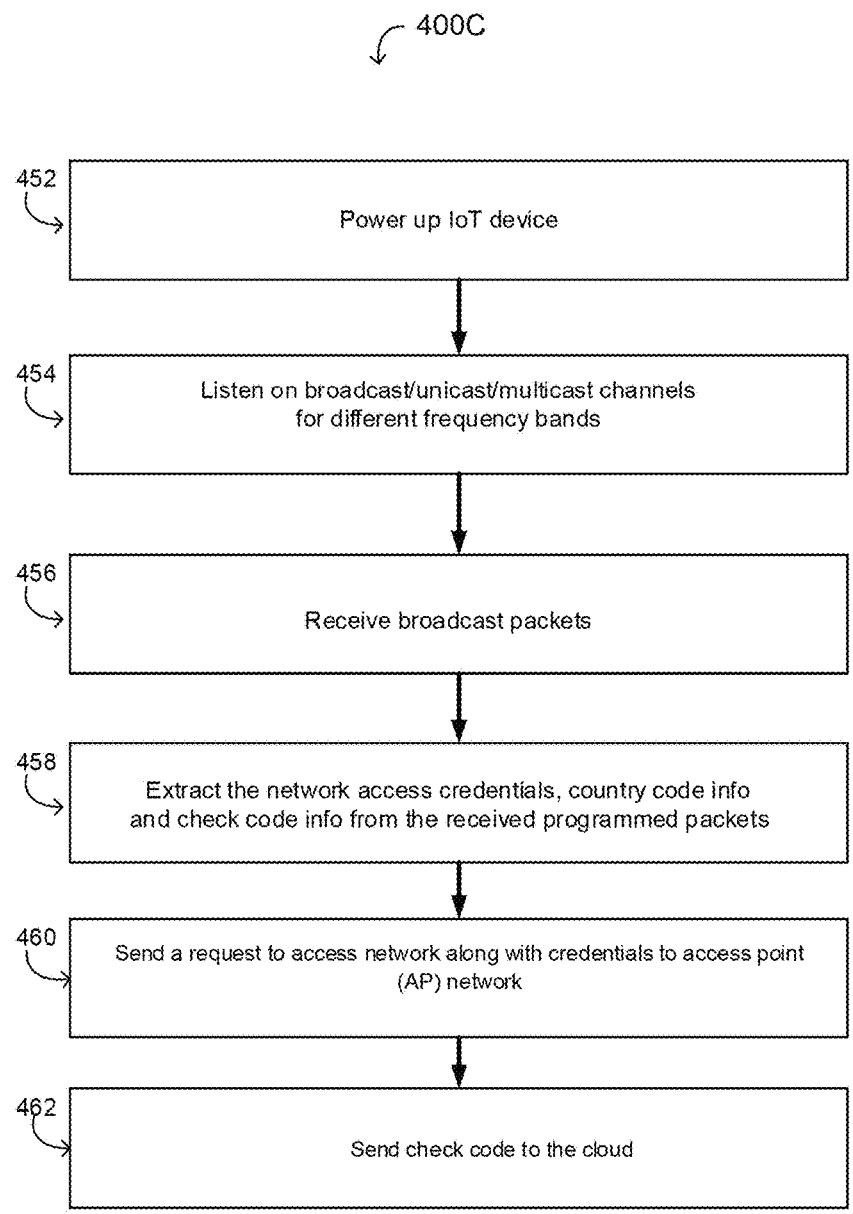
FIG. 4C illustrates an exemplary flow chart to extract network access credentials from a plurality of packets in accordance with one or more embodiments of the present disclosure.

FIG. 4C illustrates an exemplary flow chart to extract network access credentials from a plurality of packets in accordance with one or more embodiments of the present disclosure. For explanatory purposes, the example process 400C is described herein with reference to wireless access point 102A, wireless client device 104A, server 240 and IoT device 104B of FIG. 2; however, the example process 400C is not limited to wireless access point 102A, wireless client device 104A, and IoT device 104B of FIG. 2, and the example process 400C may be performed by one or more components of wireless access point 102A, wireless client device 104A, and IoT device 104B. Further for explanatory purposes, the blocks of the example process 400C are described herein as occurring in serial, or linearly. However, multiple blocks of the example process 400C may occur in parallel. In addition, the blocks of the example process 400C may be performed a different order than the order shown and/or one or more of the blocks of the example process 400C may not be performed.

In block 452 IoT device 104B is powered up and enters a local network discovery mode in preparation to be added to local wireless network area via an access point. In block 454, the IoT device 104B starts listening and hopping between broadcast/unicast/multicast channels for different frequency bands of the wireless LAN. In one or more implementations, once the IoT device 104B identifies a channel of interest with packets of a signature that is recognizable to the IoT device 104B. The hopping may be spaced apart or halted once a stream of packets of interest is detected on that channel. The hopping and listening may resume if the stream of packets stops or not all packets are received. In block 456, the packets are received by the IoT device 104B. In some aspects, the packets of interest are identified or recognized by the IoT device 104B utilizing a previously received unique packets prior to the reception of the packets of interests.

In block 458, the IoT device 104B utilizes a software, with a predetermined set of instruction stored within the IoT device 104B, to decode the encoded package/packets and extracts network access authentication information including SSID and/or passphrase and country information. The IoT device 104B has a table to aid in decoding the encoded package. In some aspects, the country information is a country code utilized by the IoT device 104B to choose a primary communication language for the IoT device 104B. The communication language of the IoT device may be used to establish audio voice messages to communicate with a user and aid the user in setting up the IoT device 104B.

In one or more implementations, once network access credentials are extracted by the IoT device 104B, a request initialized by the IoT device 104B to access the local wireless network may be sent to wireless access point 102A as shown in block 460. As depicted in FIG. 4A, The WAP 102A receives the request and the network credentials to join the wireless local area network as depicted in block 426. The WAP 102A then verify and authenticates the network access credentials in block 428 and grants access to IoT device 104B, upon authentication, to the wireless local area network as depicted in block 430.

In some aspects, the IoT device 104B transmits the private key password/check code sequence as shown in block 462. In one or more implementations, the private key password/check code sequence is utilized by the cloud server/service to authenticate IoT device 104B to be added by wireless user device 104A and/or to a user account associated to the user of the wireless user device 104A in the cloud server 240 or any other cloud server.

Figure 5:
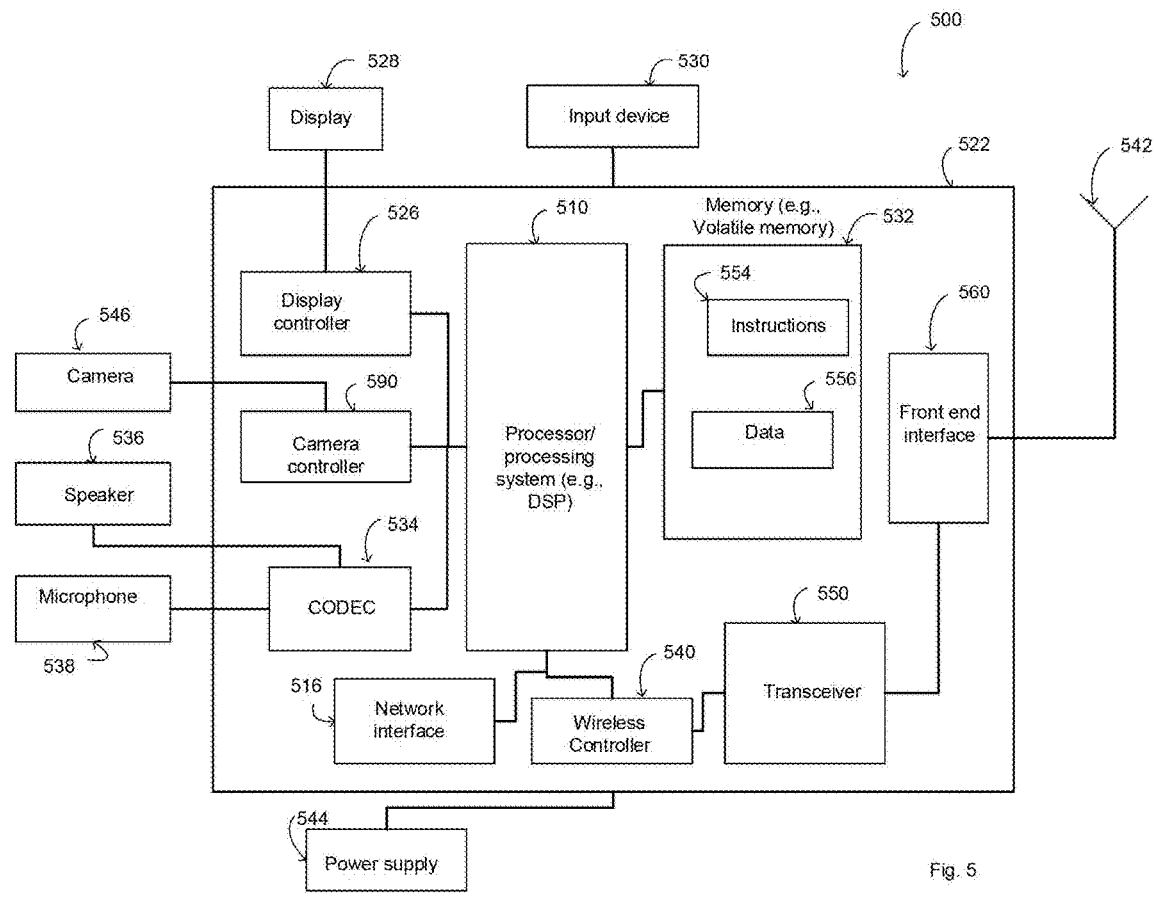
FIG. 5 illustrates conceptually an example electronic system with which some implementations of the present disclosure may be implemented.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510 such as a processor 315 and processor/processing system 356 and analytical module 384 as depicted in FIG. 3. The processor 510 may be coupled to a computer-readable storage medium, such as a memory 532 (e.g., a non-transitory computer-readable medium), via a transceiver 550. The transceiver 550 may correspond to transmitter 312 and transceiver 342 as depicted in FIG. 3. Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIG. 2B, FIG. 4A and FIG. 4B. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed:

1. An internet of things (IoT) device comprising:
   one or more processors;
   a non-transitory machine-readable medium comprising instructions stored therein, which, when executed by the one or more processors cause the one or more processors to perform operations comprising:
   hopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method;
   receiving, in response to the hopping, wireless network protocol packets from the one or more wireless network protocol frequency bands on the one or more wireless network protocol broadcast channels;
   detecting a wireless network protocol broadcast packet of interest from the wireless network protocol broadcast packets;
   extracting wireless network access credentials from the wireless network protocol broadcast packet of interest; and
   sending a request to access, to a local wireless access network utilizing the extracted wireless network access credentials;
   wherein the wireless network access credentials are encoded utilizing a private coding method and wherein the IoT device comprises instructions stored therein to decode the private coding method;
   wherein the private coding method codes a character with a unique three-or-more digit word; and
   wherein the private coding method assigns a sequential number to indicate the order of a character as it appears in the wireless access credentials, and wherein the sequential number is located adjacent to each digit of the three-or-more digit word resulting in a unique numerical code for each character.

2. The device of claim 1, wherein the wireless network access credentials comprise a service set identifier (SSID) and a passphrase word.

3. The device of claim 1, wherein the extracting further comprises extracting a country code information and utilizing the country code information to determine a primary language of communication for the IoT device.

4. The device of claim 1, wherein the broadcast packet of interest comprises a private key password.

5. The device of claim 4, wherein the operations further comprises sending the private key password and a device identification number to a cloud server.

6. The device of claim 5, wherein the cloud server utilizes the private key password and the device identification number to allow adding the IoT device to a user account.

7. The device of claim 1, wherein the length of the wireless network protocol broadcast packet is varied based on the unique numerical code.

8. The device of claim 1, wherein the wireless network protocol broadcast packet further comprises a header comprising management information.

9. The device of claim 1, wherein detecting a wireless network protocol broadcast packet of interest is based on utilizing a previously received unique packet by the IoT device.

10. A method comprising:
    hopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method;
    receiving, in response to the hopping, wireless network protocol packets from the one or more wireless network protocol frequency bands on the one or more wireless network protocol broadcast channels;
    detecting a wireless network protocol broadcast packet of interest from the wireless network protocol broadcast packets;
    extracting wireless network access credentials from the wireless network protocol broadcast packet of interest; and
    sending a request to access, to a local wireless access network utilizing the extracted wireless network access credentials;
    wherein the wireless network access credentials are encoded utilizing a private coding method and wherein the IoT device comprises instructions stored therein to decode the private coding method;
    wherein the private coding method codes a character with a unique three-or-more digit word; and
    wherein the private coding method assigns a sequential number to indicate the order of a character as it appears in the wireless access credentials, and wherein the sequential number is located adjacent to each digit of the three-or-more digit word resulting in a unique numerical code for each character.

11. The method of claim 10, wherein the wireless network access credentials comprise an SSID and a passphrase word.

12. The method of claim 10, wherein the extracting further comprises extracting a country code information and utilizing the country code information to determine a primary language of communication for the IoT device.

13. The method of claim 10, wherein broadcast packet of interest comprises a private key password.

14. The method of claim 13, wherein the operations further comprises sending the private key password and a device identification number to a cloud server.

15. The method of claim 14, wherein the cloud server utilizes the private key password and the device identification number to allow adding the IoT device to a user account.

16. The method of claim 10, wherein the length of the wireless network protocol broadcast packet is varied based on the unique numerical code.

17. The method of claim 10, wherein the wireless network protocol broadcast packet further comprises a header comprising management information.

18. The method of claim 10, wherein detecting a wireless network protocol broadcast packet of interest is based on utilizing a previously received unique packet by the IoT device from an application.

19. A non-transitory machine-readable medium comprising instructions stored therein, which, when executed by one or more processors of a processing system cause the one or more processors to perform operations comprising:
- hopping, between one or more wireless network protocol frequency bands and one or more wireless network protocol broadcast channels, wherein the wireless network protocol broadcast channels utilizes one or more of a multicast broadcasting method, a unicast broadcasting method, and a broadcast broadcasting method;
- receiving, in response to the hopping, wireless network protocol packets from the one or more wireless network protocol frequency bands on the one or more wireless network protocol broadcast channels;
- detecting a wireless network protocol broadcast packet of interest from the wireless network protocol broadcast packets;
- extracting wireless network access credentials from the wireless network protocol broadcast packet of interest; and
- sending a request to access, to a local wireless access network utilizing the extracted wireless network access credentials;
- wherein the wireless network access credentials are encoded utilizing a private coding method and wherein the IoT device comprises instructions stored therein to decode the private coding method;
- wherein the private coding method codes a character with a unique three-or-more digit word; and
- wherein the private coding method assigns a sequential number to indicate the order of a character as it appears in the wireless access credentials, and wherein the sequential number is located adjacent to each digit of the three-or-more digit word resulting in a unique numerical code for each character.

20. The non-transitory machine-readable medium of claim 19, wherein the wireless network access credentials comprise an SSID and a passphrase word.

21. The non-transitory machine-readable medium of claim 19, wherein the extracting further comprises extracting a country code information and utilizing the country code information to determine a primary language of communication for the IoT device.

22. The non-transitory machine-readable medium of claim 19, wherein broadcast packet of interest comprises a private key password.

23. The non-transitory machine-readable medium of claim 22, wherein the operations further comprises sending the private key password and a device identification number to a cloud server.

* * * * *